United States Patent [19]

Sonobe et al.

[11] 4,331,897
[45] May 25, 1982

[54] COMMUTATOR APPARATUS FOR ROTARY ELECTRIC MACHINE

[75] Inventors: Tadashi Sonobe, Iwaki; Mitsuhiro Nitobe; Shinzi Saruwatari, both of Hitachi; Sueo Kawai; Toshio Hattori, both of Ibaraki, all of Japan

[73] Assignee: Hitachi, Ltd., Tokyo, Japan

[21] Appl. No.: 136,490

[22] Filed: Apr. 3, 1980

[30] Foreign Application Priority Data

Apr. 9, 1979 [JP] Japan ................. 54/42065

[51] Int. Cl.³ .............................................. H02K 5/24
[52] U.S. Cl. ...................................... 310/234; 310/51; 310/271
[58] Field of Search ................. 310/233, 51, 220, 221, 310/223, 231, 227, 228, 234, 235, 236, 45, 271; 174/138 R, 138 D

[56] References Cited

U.S. PATENT DOCUMENTS

| | | | |
|---|---|---|---|
| 1,357,016 | 10/1920 | Zimmerman | 310/234 |
| 3,274,413 | 9/1966 | Adriance | 310/234 |
| 3,824,416 | 7/1974 | Van De Griend | 310/51 |

FOREIGN PATENT DOCUMENTS

| | | | |
|---|---|---|---|
| 666018 | 7/1963 | Canada | 310/234 |
| 1513778 | 3/1970 | Fed. Rep. of Germany | 310/233 |
| 42-15201 | 8/1967 | Japan | 310/234 |
| 52-47704 | 4/1977 | Japan | 310/51 |
| 54-115710 | 9/1979 | Japan | 310/51 |

*Primary Examiner*—R. Skudy
*Attorney, Agent, or Firm*—Craig and Antonelli

[57] ABSTRACT

A commutator apparatus for rotary electric machines comprises a plurality of commutator segments mounted side by side on a rotary shaft through an insulating ring along the periphery thereof, an armature winding wound on a rotor core and including a plurality of coil ends projected axially from the rotor core, and a plurality of risers made of a conductor, one end of each thereof being connected to one axial end of the corresponding commutator segments, the other end of the riser being securely connected to one end of the corresponding armature coil. Each pair of adjacent risers are bound by an insulating binder to reduce the space therebetween, thus forming a substantially delta-shaped space defined by the adjacent risers on each side of said binder. The vibrations of the risers are thus absorbed and the vibratory stress of the risers is reduced, thus improving the mechanical strength and reliability of the commutator apparatus.

8 Claims, 14 Drawing Figures

COMMUTATOR APPARATUS FOR ROTARY ELECTRIC MACHINE

BACKGROUND OF THE INVENTION

This invention relates to an improvement in a commutator apparatus of such rotary electric machine with commutators as a DC motor and a DC generator, or more in particular to an improvement in the commutator apparatus of a rotary electric machine having a comparatively large radial gap between the commutator and the armature coil.

Generally, the commutator of the rotary electric machine of this type mainly comprises a plurality of commutator segments arranged in juxtaposition or side by side on a rotary shaft through an insulator material. Between the commutator segments and the armature winding, there are provided a plurality of risers for electrically connecting them with each other. In some rotary electric machines with the commutator segments and the armature winding thereof in proximity to each other, each end of the armature coils is directly coupled to each of the commutator bars. Generally, however, there is formed some radial gap between the armature coils and the commutator segments, in which gap a plurality of risers are arranged.

Each of the risers is comprised of a conductor and the sole function thereof is to connect electrically the armature winding and the commutator. Since each riser is formed on the rotor, however, it requires a considerable mechanical strength. For this purpose, the riser is generally securely supported on a support ring provided rear each riser. However, since the rotary electric machines have been increased in speed and size, such support means fails to provide a sufficient rigidity against vibrations to the rotational direction, so that the rotary electric machine is likely to vibrate in rotation, sometimes leading to the breakage of the risers, resulting in a serious accident.

Such an accident is especially likely to occur in the case of a commutator apparatus of a large DC rotary electric machine for driving the main roll of a rolling mill, which is subjected to a shock vibration from the roll in operation, i.e., the load. This has been a subject long pending for solution.

A commutator apparatus used for rotary electric machines of high speed and large capacity and comparatively resistant to such vibrations is disclosed, for example, in Japanese Utility Model Publication No. 15201/67. In this apparatus, as shown in FIGS. 7 and 8, risers 3 coupling commutator segments 1 and an armature winding 2 to each other are divided in a plurality of groups and each group is bundled by means of a coupling member 4 thereby to form a large space between the riser groups, so that a path of the cooling air is secured on the one hand and the vibrations of the risers are prevented on the other hand. In the drawing under consideration, reference numeral 5 shows a spacer segment interposed between the armature coils, and numeral 6 an insulation ring for insulating the commutator bar from the rotor shaft.

The commutator riser of this type, however, is not satisfactory in view of the fact that the rigidity thereof against and the ability thereof to attenuate the rotational vibrations are very small for the reasons mentioned below.

From the viewpoint of the strength of materials, each of the risers is an independent curved girder so constructed that adjacent risers do not exert any shearing force or moment on each other by the bending deformation in the rotational direction. Therefore, the bending rigidity of the riser in the rotational direction is very low. Also, a very small bending moment and axial force are exerted between adjacent risers or from the risers to the aramature coil and the commutator bars. As a result, substantially no energy is consumed in these parts for damping the riser vibrations, and therefore the riser vibrations are not substantially deadened by energy consumption.

Assume that this type of riser is used with a DC motor for driving the main roll 9 in tandem rolling of ingots 7 and 8 as shown in FIG. 9. The stress as shown in FIG. 10 is generated in the riser.

Specifically, the riser stress $\sigma_a$ which is generated at the time point $t_1$ when the biting of the ingot 7 is released by the main roll 9 at the end of the rolling of the ingot 7 is not sufficiently attenuated during the time period $\Delta t$ from the time point $t_1$ to the time point $t_2$ of biting the next ingot 8. The shock vibration which occurs at this very time point is superimposed on the remaining stress $\sigma_b$ of the riser, thus causing a larger riser stress $\sigma_c$.

A measurement of this phenomenon will be expressed below in numerals as calculated on the site of an actual rolling mill.

Let the diameter of the main roll D be 1000 mm, the rotational speed of the main roll N be 70 r.p.m., and the gap between adjacent ingots 1 be 100 mm. Then the ingot speed V is given as $$V = \frac{D}{2} \times \frac{2\pi N}{60} = \frac{1000}{2} \times \frac{2\pi \times 70}{60} = 3665 \text{ mm/sec}$$

Also the time period $\Delta t$ is expressed as $$\Delta t = V/l = 3665/100 = 0.027 \text{ sec}$$

Actual measurements show that the natural frequency of riser vibration $f_n$ is 480 Hz, and the attenuation rate of the riser vibration $\tau$ is 0.01. Therefore, the riser stress is attenuated to the degree shown below during the time period $\Delta t$.

$$\sigma_b/\sigma = e^{-\tau \omega n \cdot \Delta t} = e^{-\tau 2\pi f n \cdot \Delta t}$$
$$= e^{-0.01 \times 2\pi 480 \times 0.027} \approx 0.5$$

In other words, the stress of about 50% remains unattenuated in this case, which residual stress increases the riser stress, finally leading to the breakage of the riser.

SUMMARY OF THE INVENTION

An object of the present invention is to provide a commutator apparatus reliable in mechanical strength with only small vibratory stress being generated in the risers under the rotational vibratory force in a high-speed rotation or shock vibratory force.

According to the present invention, there is provided a commutator apparatus in which each pair of adjacent risers is bundled by an insulating binding member in such a manner as to reduce the distance between adjacent risers at the bound portions, whereby substantially delta-shaped spaces defined by the adjacent risers are formed on both sides of the binding member, thus improving the attenuation effect of the risers.

DESCRIPTION OF THE PREFERRED EMBODIMENTS

Figure 1:
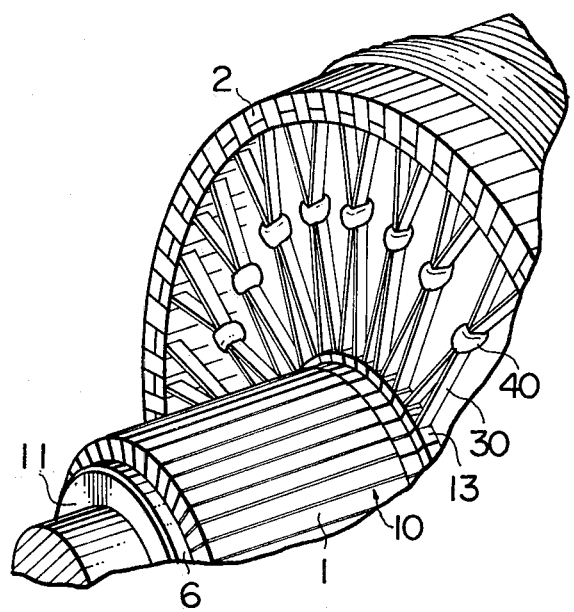
FIG. 1 is a longitudinal sectional view showing the essential parts of a commutator apparatus according to the present invention.

The present invention will be described below in detail with reference to the embodiments shown in the drawings.

Figure 2:
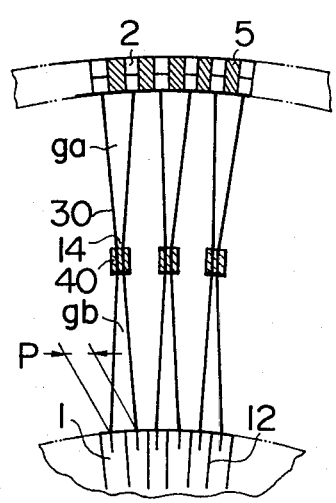
FIG. 2 is a front view of the apparatus shown in FIG. 1.

The diagram of FIGS. 1 and 2 show parts around the risers including an armature winding 2, a commutator 10 and risers 30 of a DC rotary electric machine.

The armature winding 2 is wound on a rotor core (not shown) and has ends thereof protruded toward the commutator 10.

The commutator 10 is securely held on a rotary shaft 40 through a support member 11 and an insulating ring 6. This commutator 10 comprises a multiplicity of commutator segments 1 and insulator segments 12 arranged alternately with each other. The outer peripheral surface of the commutator 10 is in sliding contact with a brush (not shown), thus performing electric conduction between the rotor and stator. The commutator includes on the outer periphery thereof portions 13 where the risers 30 are secured. The portions 13 are located at an axial end of the outer periphery, that is, an end thereof nearer to the armature winding.

The risers 30 are located between this commutator and the armature winding 2.

An end (the upper end in the drawing) of the riser 30 is connected electrically (as well as mechanically) to an end of the armature coil 2 by soldering or brazing, while the other end thereof is connected to the end 13 of the commutator by brazing or soldering in a manner similar to the upper end thereof.

Figure 11:
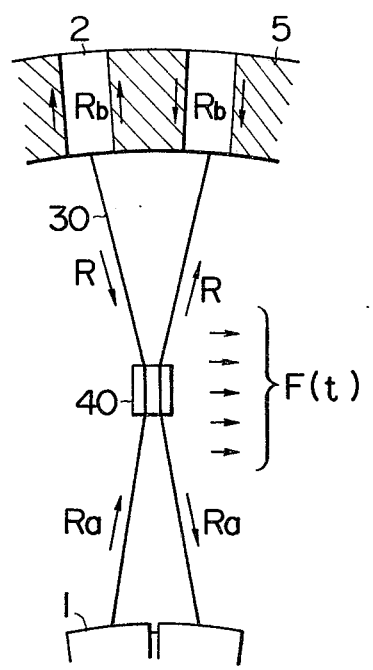
FIGS. 11 to 13 are diagrams for explaining the energy attenuation effect of a commutator apparatus according to the present invention.

Each pair of adjacent two risers 30 are bound by a binding member 40 at substantially the longitudinal central part thereof in a manner as mentioned below. An insulator segment 14 having a thickness smaller than the riser interval P is interposed between the adjacent two risers to be bound, so that the adjacent risers are bound with the insulator therebetween sufficiently to make the interval at the bound portion of the bound adjacent risers smaller than the riser interval P. In other words, the adjacent risers are bound in such a manner as to form delta-shaped spaces $g_a$ and $g_b$ above and under the bound part. In the case where the inertia F(t) is exerted on the commutator risers 30 as shown in FIG. 11, reaction forces R and $R_a$ are generated in the risers by the truss effect, while reaction force $R_b$ is generated at the base of the risers such as between the armature coil 2 and the spacer 5.

A very small elastic displacement at the base of the riser and the reaction force $R_b$ cause an energy loss at the riser base, thus attenuating the inertia.

Figure 12:
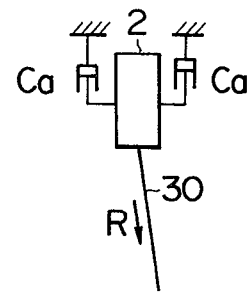

The manner in which this attenuation effect is attained is shown graphically using an attenuation constant $C_a$ in FIG. 12.

Figure 13:
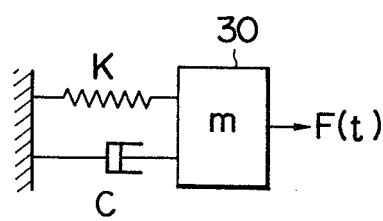

A vibration system of this commutator riser is shown in FIG. 13. The mass m of the riser 30, which is supported by the spring constant K incorporating an improved rigidity by the truss and the large attenuation constant C attributable to energy loss at the riser base, is not substantially responsive to the vibratory force F(t).

Figure 14:
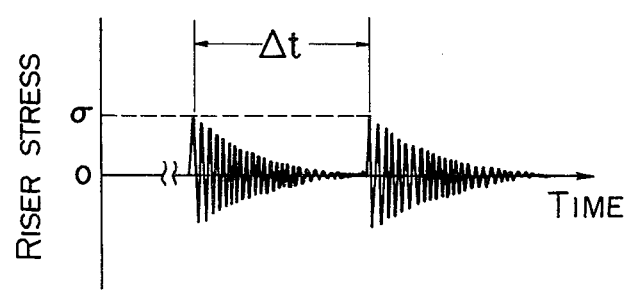
FIG. 14 is a diagram showing changes in stress of a commutator apparatus according to the present invention.

The graph of FIG. 14 represents the result of measuring the attenuation effect of this embodiment by use of a mock-up. It will be seen that a very great attenuation effect is attained. Specifically, measurements numerically obtained include the natural frequency of the riser $f_n$ of 900 Hz (actual measurement) and the riser attenuation rate $\tau$ of 0.02 (actual measurement). From these figures, the attenuation of the riser stress during the period $\Delta t$ (=0.027 sec) is given as $$\sigma'/\sigma = e^{-\tau \omega n \cdot \Delta t} = e^{-\tau \cdot 2\pi f n \cdot \Delta t} = e^{-0.02 \times 2\pi \times 900 \times 0.027} \approx 0.05$$

As seen, this embodiment is such that only about 5% of the stress remains unattenuated, which is about one tenth of the residual stress of 50% for the conventional apparatus, thus attaining a very high attenuation effect (ten times in terms of stress-converted effect).

Figure 5:
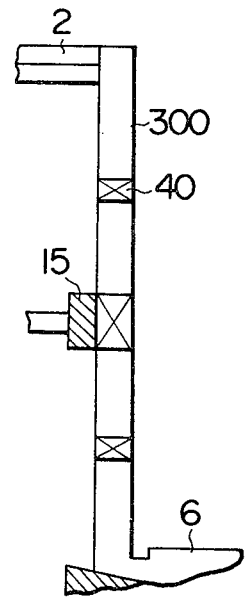
FIG. 5 is a longitudinal sectional view showing still another embodiment of the present invention.
Figure 6:
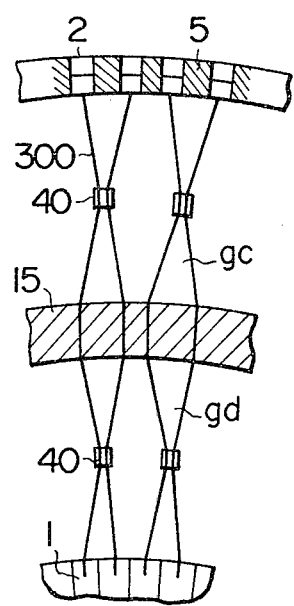
FIG. 6 is a front view of the embodiment shown in FIG. 5.
Figure 7:
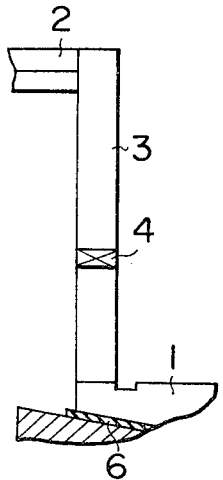
FIG. 7 is a longitudinal sectional view showing the essential parts of a prior art commutator apparatus.
Figure 8:
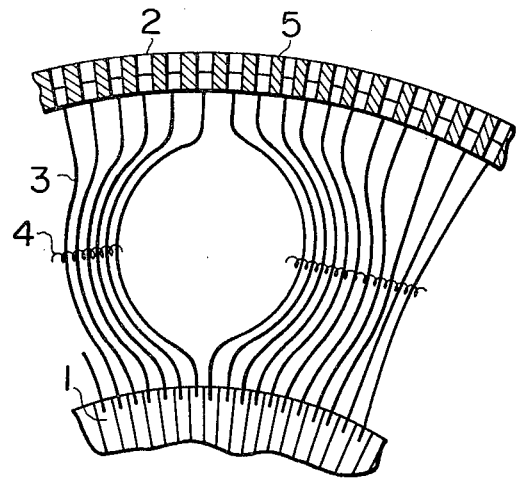
FIG. 8 is a front view of the apparatus shown in FIG. 7.
Figure 9:
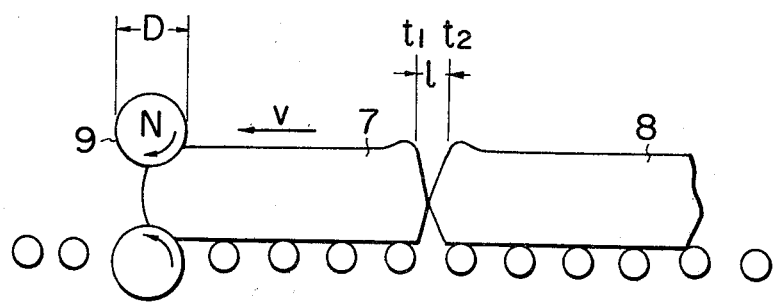
FIG. 9 is a side view showing the relation in shock between a rolled ingot and the commutator apparatus.
Figure 10:
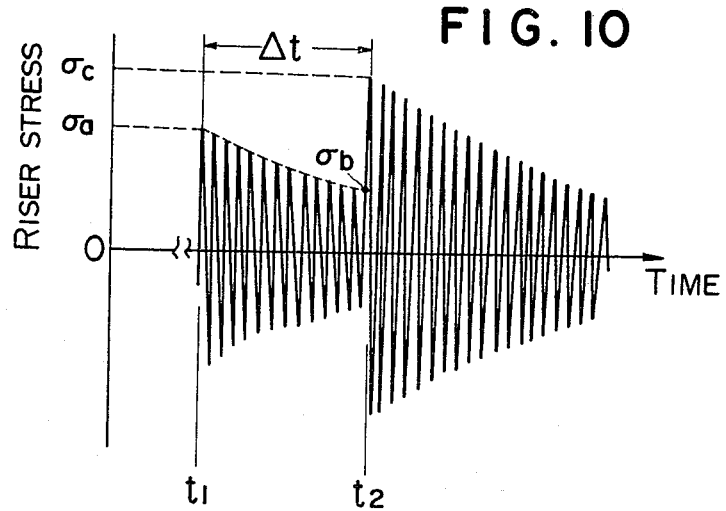
FIG. 10 is a stress diagram showing changes in stress of a prior art commutator apparatus.

In this embodiment, the binder is used at one point of each pair of adjacent risers, but it may be used at more than one point. In the case of a long riser, for instance, the binders 40 may be provided at two points of each pair of adjacent risers 300 as shown in FIGS. 5 and 6. In this case, a holding ring 15 concentrical with the commutator 1 is provided between the two binders 40 in such a manner as to form delta-shaped spaces $g_c$ and $g_d$ between the holding ring 15 and the binders 40.

Figure 3:
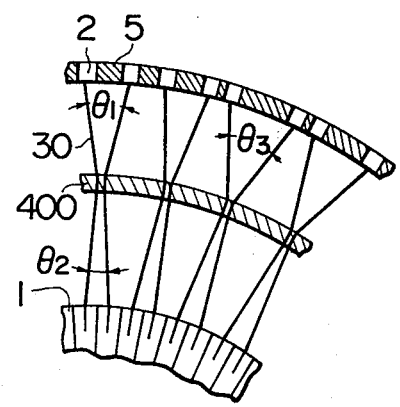
FIGS. 3 and 4 are front views showing other embodiments of the present invention.
Figure 4:
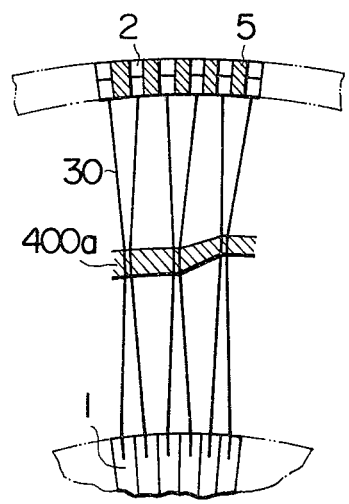

Another embodiment is shown in FIG. 3. In this case, a ring binder 400 annularly formed in peripheral direction is used to bind each pair of adjacent risers instead of the binders 40. This binder 400 may be positioned almost at the center of the risers but slightly nearer to one side of the risers, for example, toward the armature coil in this case, to some degree. In such a configuration, the angles $\phi_1$ and $\phi_2$ of the delta-shaped spaces defined by each pair of adjacent risers above and under the binder 400 are different from each other and therefore the upper and lower riser portions divided by the binder also differ in vibration mode and natural frequency, thus effectively offsetting the vibrations thereof with each other. A similar effect is also attained by differentiating the angles of adjacent risers by changing the intervals of the armature coils as shown in FIG. 3, wherein, for instance, one angle $\phi_1$ is smaller than another angle $\phi_3$. As another alternative method to attain the same effect, the binder 400 may be positioned at different points in adjacent pairs of the risers as shown in FIG. 4.

It is explained above that according to the present invention each pair of adjacent risers are bound by an insulating binder in such a manner as to make the interval at the bound portion of the bound adjacent risers smaller than the interval of the bound adjacent risers at the end thereof, so that substantially delta-shaped spaces are formed on both sides of the binder. As a result, the inertia exerted on the risers is fully imparted to the riser base, and the small elastic change at the riser base attenuates the inertia. It is thus possible to provide a commutator apparatus small in vibratory stress in the risers and hence high in mechanical strength.

We claim:

1. A commutator apparatus for a rotary electric machine comprising:
   a commutator disposed on a circumferential surface of a rotary shaft through an insulation ring, said commutator includng a plurality of commutator segments and a plurality of insulator segments arranged alternately with each other in a circumferential direction of the rotary shaft;
   a plurality of risers each secured to the outer end of a corresponding one of said commutator segments and extending longitudinally in a radial direction of said rotary shaft;
   an armature winding having a plurality of armature coils each disposed through a spacer segment in the circumferential direction of said rotary shaft, said armature coils being coupled to the outer ends of said risers respectively; and
   a plurality of insulating binders for bindng respective pairs of adjacent two risers in such a manner as to make the distance between each pair of said adjacent two risers at the bound portions thereof smaller than the distance between said pair of said adjacent two risers at the ends thereof, thus forming two substantially delta-shaped spaces formed by the bound adjacent two risers on both sides of each of said binders.

2. A commutator apparatus for a rotary electric machine according to claim 1, wherein said spaces formed on both sides of said binder are asymmetric with each other.

3. A commutator apparatus for a rotary electric machine according to claim 1, wherein said binders are continuously connected one another along the peripheral direction of said rotary shaft.

4. A commutator apparatus for a rotary electric machine according to claim 1, wherein those of said spaces which are adjacent to each other along the peripheral direction have different delta shapes.

5. A commutator apparatus for a rotary electric machine according to claim 1, wherein said adjacent two risers on both sides of each of said binders continuously diverge from the bound portion thereof so that said two substantially delta-shaped spaces provide a truss effect for attenuating the vibratory stress in said risers.

6. A commutator apparatus for a rotary electric machine comprising:
   a plurality of commutator segments arranged side by side on a rotary shaft through an insulation ring along the periphery thereof;
   a plurality of risers secured to one of the axial ends of said commutator segments and extending longitudinally in radial direction;
   an armature windidng coupled to the outer ends of said risers;
   a holding ring for holding said risers between said armature winding and said commutator segments; and
   a plurality of insulating binders for binding each pair of adjacent riser portions between said holding ring and said armature winding, said insulating binders also binding each pair of adjacent riser portions between said holding ring and said commutator segments, in such a manner as to make the interval at the bound portion of each pair of said adjacent risers smaller than the interval of said adjacent risers at the end thereof, thus forming substantially delta-shaped spaces on both radial sides of said binder.

7. A commutator apparatus for a rotary electric machine comprising:
   a commutator disposed on a circumferential surface of a rotary shaft through an insulation ring, said commutator including a plurality of commutator segments and a plurality of insulator segments arranged alternately with each other in a circumferential direction of the rotary shaft;
   a plurality of risers each secured to the outer end of a corresponding one of said commutator segments and extending longitudinally in a radial direction of said rotary shaft;
   an armature winding having a plurality of armature coils each disposed through a spacer segment in the circumferential direction of said rotary shaft, said armature coils being coupled to the outer ends of said risers respectively;
   a holding ring for holding said risers disposed between said armature winding and said commutator segments; and
   a plurality of insulating binders for binding respective pairs of adjacent two risers sandwiched between said holding ring and said armature winding, and a plurality of insulating binders for binding respective pairs of adjacent two risers sandwiched between said holding ring and said commutator segments, in such a manner as to make the distance between each pair of said adjacent two risers at the bound portions thereof smaller than the distance between said pair of said adjacent two risers at the ends thereof, thus forming two substantially delta-shaped spaces on both radial sides of each of said binders.

8. A commutator apparatus for a rotary electric machine according to claim 7, wherein said adjacent two risers on both sides of each of said binders continuously diverge from the bound portion thereof so that said two substantially delta-shaped spaces provide a truss effect for attenuating the vibratory stress in said risers.

* * * * *